United States Patent Office 3,109,150
Patented Oct. 29, 1963

3,109,150
COLD TRANSMISSION LINE TERMINATIONS
Harvey W. Glass, Babylon, and Charles S. Tyler, North Babylon, N.Y., assignors to Cutler-Hammer, Inc., Milwaukee, Wis., a corporation of Delaware
Filed July 31, 1962, Ser. No. 213,819
5 Claims. (Cl. 333—22)

This invention relates to cold transmission line terminations.

Noise generators are frequently used for measuring the noise figure of electronic amplifiers, etc. One type of noise generator employs hot and cold bodies as noise sources. By measuring the output of the amplifier with each noise source connected to its input, the noise figure can be determined.

In one instrument of this type, properly terminated transmission line probes are employed. One probe is inserted in an oven held at 100° C. (373.1° K.), and the other is inserted in a refrigerating chamber containing liquid nitrogen whose boiling point is 77.3° K. In practice, coaxial transmission line probes are employed, with resistor terminations.

To obtain precise measurement of the noise figure, the resistor termination should accurately match the characteristic impedance of the transmission line, so as to give a low voltage standing wave ratio (VSWR), say not exceeding 1.15. In use it has been noted that the cold probe frequently gives a higher VSWR, even though close matching is initially attained during manufacture. It has been found that the higher VSWR is largely or entirely due to the presence of liquid oxygen inside the probe, which is condensed from air in the probe by the colder liquid nitrogen. The dielectric constant of liquid oxygen is high compared to air, and this changes the characteristic impedance of the transmission line with resultant mismatch at the terminating resistor.

One solution to this problem would appear to be an hermetically sealed probe free of oxygen. However, this would result in considerably higher manufacturing costs, and materials available for sealing would result in a higher VSWR. Accordingly this procedure is unsatisfactory.

In accordance with the present invention, an aperture is made in the probe and means provided for maintaining at the aperture an atmosphere of the gas which, in liquefied form, is used to refrigerate the probe. As the probe is refrigerated and the pressure therein tends to decrease, this gas is drawn in and reduces the relative proportion of the oxygen. Upon subsequent heating of the probe, as by bringing it to room temperature, the liquid oxygen boils and a portion of the gaseous oxygen passes out of the probe along with a portion of the added gas. After a few cycles of such operation, it is found that the proportion of oxygen in the probe has been reduced to a point where it is no longer troublesome.

In a specific embodiment described hereinafter, a tube is provided for leading gas boiled off in the refrigerating chamber to the aperture in the probe, and a hole is provided in the wall of the tube near the aperture which opens into the air. In this manner, when liquefied gas is introduced into the chamber and cooling begins, the air in the tube is quickly flushed out, and thereafter an atmosphere of the gas is maintained at the aperture.

The invention will be more fully described in connection with a specific embodiment thereof, where the detailed operation will be explained more fully.

In the drawings:

FIG. 3 is a view of the probe, partially in cross-section;

FIG. 4 is a cross-sectional view along the line 4—4 of FIG. 3; and

FIG. 5 is a view partially in cross-section along the line 5—5 of FIG. 4.

Figure 1:
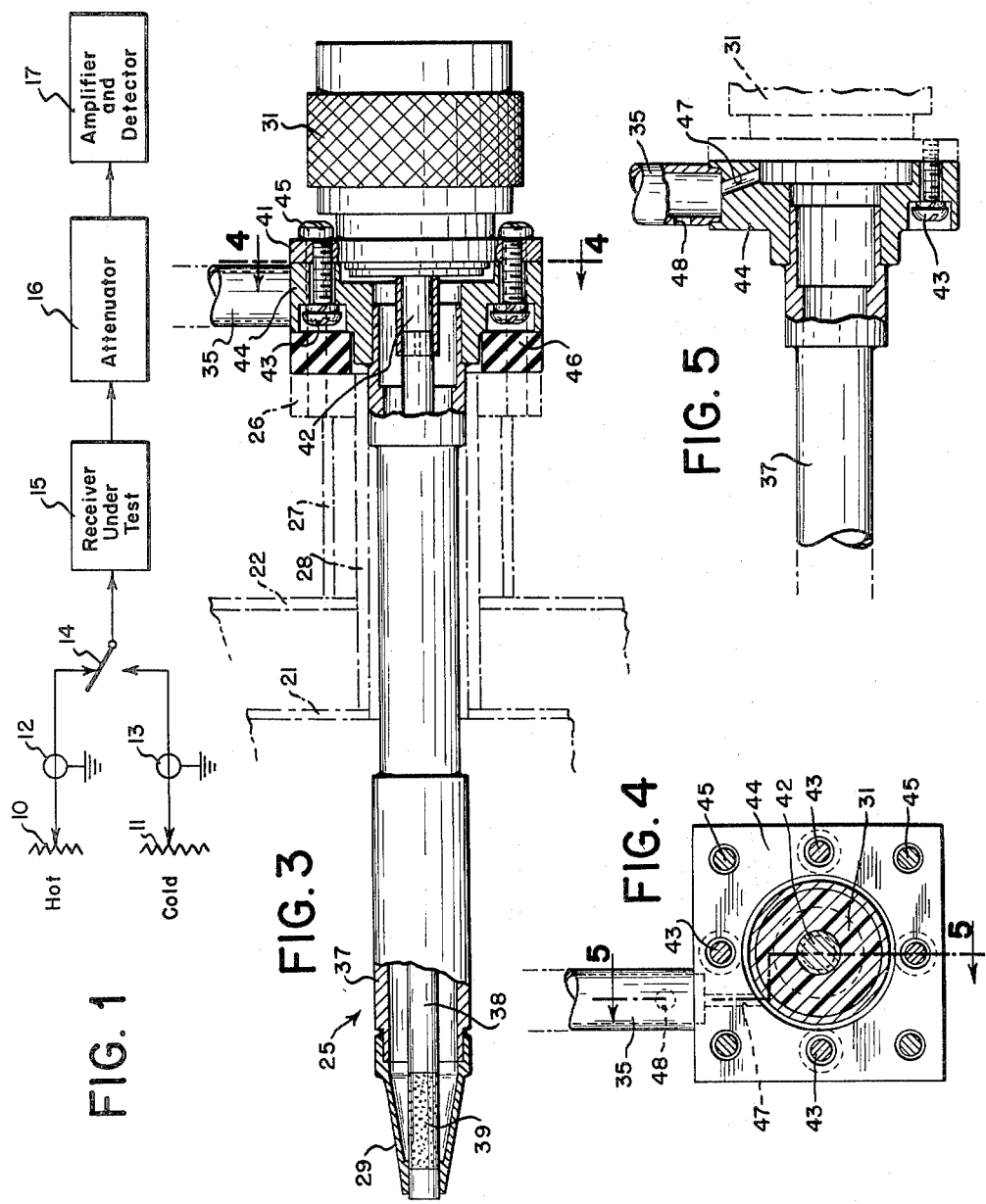
FIG. 1 is a schematic diagram illustrating noise measurements with hot and cold bodies.

Referring to FIG. 1, hot and cold body terminations are shown at 10 and 11. These are connected by coaxial lines indicated diagrammatically at 12 and 13 to switch 14. This switch is actually a coaxial line switch, but is shown diagrammatically for simplicity of illustration. The hot and cold bodies are connected alternatively by switch 14 to the receiver under test shown at 15. The output of the receiver is fed through an attenuator 16 to an amplifier and detector unit 17. By adjusting the attenuator for equal responses from the detector for the hot and cold bodies, the noise figure of the receiver 15 can be determined. The principles of measurement are known in the art and need not be described further.

Figure 2:
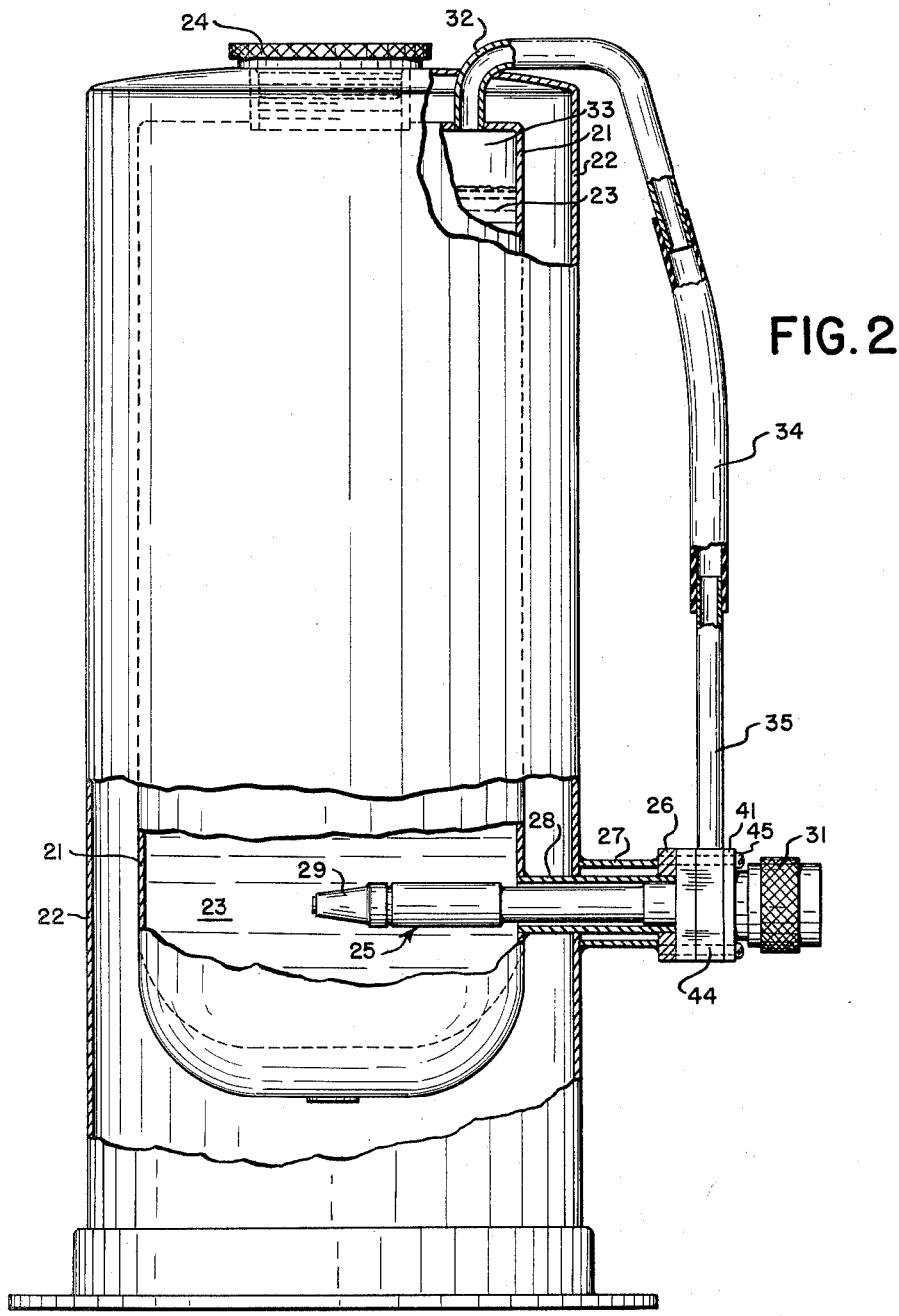
FIG. 2 is an overall view, partially in cross-section, of a cold transmission line termination in accordance with the invention.

Referring now to FIG. 2, a refrigerating chamber is shown in the form of a Dewar flask having inner and outer walls 21 and 22, respectively. Liquefied gas 23 is poured into the chamber through an opening in the top thereof, and stopper 24 then screwed in place to provide a closed chamber. A transmission line probe 25 is mounted in the walls of the chamber by a plate 26 attached to the outer and inner walls by cylindrical members 27 and 28. The inner terminated end 29 of the probe extends into the chamber so as to be cooled by the liquefied gas therein. It is here assumed that the liquefied gas is liquid nitrogen, which has a boiling point lower than that of liquid oxygen.

The probe 25 is a coaxial line probe provided with a fitting 31 for connection to external coaxial line components.

A tubular element 32 is mounted in the top of the chamber and connects with the upper region 33 thereof which contains gas boiled off from liquid 23. Tubular element 32 is connected through a tube 34 to a tubular member 35 of the probe.

Referring now to FIG. 3, the probe 25 includes an outer cylindrical conductor 37 and an inner conductor 38 forming a coaxial transmission line. At the inner end of the probe the coaxial line is terminated by a resistor 39 connected between the inner and outer conductors. The resistance of resistor 39 is selected to match the characteristic impedance of the coaxial line.

Coaxial connector 31 has its outer conductor ending in flange 41 and an inner conductor 42. The coaxial spacing is maintained by a dielectric spacer which fits closely in the outer conductor and closely around the inner conductor, although the fit need not provide an hermetic seal. Flange 41 is attached by bolts 43 to a flange 44 on the probe, the latter being soldered to member 37 of the probe. Inner conductor 42 of the fitting is provided with spring fingers to engage and hold the inner conductor 38 of the probe. The flanges 41 and 44 of the assembly are bolted to plate 26 by bolts 45, a resilient washer 46 being interposed therebetween. Tube section 35 is connected with the interior of the probe, as will be described in connection with FIGS. 4 and 5.

Referring to FIGS. 4 and 5, tube section 35 is attached to flange 44 of the probe, and an aperture 47 connects with the interior of the probe. Aperture 47 is shown as a small hole drilled in flange 44, thereby being in the outer wall of the probe, and in practice a hole having a diameter of 80 mils is employed. Tube section 35 also has a hole 48 opening into the air, and adjacent aperture 47. Hole 48 has a diameter larger than than that of aperture 47 and, due to the thin wall of member 35, provides considerably less resistance to gas flow therethrough.

It will be seen that the tube comprising sections 32, 34 and 35 provides a passage from the top of the refrigerating chamber to the surrounding air through hole 48, and to the interior of the probe through aperture 47.

Considering now the manner in which the arrangement functions to eliminate mismatch due to the presence of liquid oxygen in the probe, it will be initially assumed that the apparatus is at room temperature, without liquid nitrogen in the refrigerating chamber. Under these conditions, air at atmospheric pressure will be present in the hollow interior of probe 25, between the outer and inner coaxial members 37, 38.

Liquid nitrogen is then introduced into the chamber. Violent boiling will occur as nitrogen gas forms, until the wall temperature of the flask reaches the temperature of the liquid nitrogen. In practice, the flask is first partially filled with liquid nitrogen, say half full, and stopper 24 replaced so that the gas is forced through the tube and flushes out air therein. Hole 48 (FIG. 5) allows gas to pass into the surrounding air so that the pressure in the upper region of the flask is substantially atmospheric pressure. When the violent boiling subsides, additional liquid nitrogen may be poured into the flask until the flask is nearly filled, say to within one-half inch of the top. Stopper 24 is again replaced. Under operating conditions, there will always be some slight boiling of the liquid nitrogen so that a gas discharge through the tube will always be present.

Aperture 48 is advantageously sufficiently large so that air in tubular sections 32, 34 and 35 is completely flushed out before substantial cooling of the probe takes place. As the probe cools, the air pressure therein tends to decrease. The pressure at the outer end of aperture 47 is substantially atmospheric pressure, but the gas present at the aperture is substantially pure nitrogen. Accordingly, as the pressure in the probe is reduced, nitrogen gas enters through aperture 47, thus decreasing the oxygen/nitrogen ratio within the probe. When the probe is cooled down below the liquefying temperature of oxygen, liquid oxygen will be formed in the probe. However, the presence of nitrogen gas at aperture 47 prevents more air (with accompanying oxygen) from entering. Initially, the amount of liquid oxygen thus formed in the probe may adversely affect the VSWR.

If, now, the liquid nitrogen is poured out of the flask, a small rise in temperature of the probe will cause the liquid oxygen to be vaporized. Since the outer end of the probe will always be at a higher temperature than the inner end, convection currents will be present inside the probe and the oxygen gas will be mixed with the nitrogen gas present therein. As the probe heats up toward room temperature, the pressure of the gas mixture within the probe will increase, thereby forcing some of the mixture out through aperture 47 into the surrounding air. When the probe reaches an elevated temperature with respect to its cold temperature, say room temperature, the gas mixture remaining within the probe will have a substantially smaller proportion of oxygen than originally present therein.

Then, liquid nitrogen may again be introduced into the refrigerating chamber to cool the probe, thereby drawing more nitrogen into the probe through aperture 47. This will further reduce the proportion of oxygen to nitrogen in the probe. After several cycles of this operation, the amount of oxygen remaining within the probe will be so small that any liquefying thereof will have a negligible effect on the VSWR.

In practice, the joints between flanges 41 and 44, and between inner and outer members of the coaxial fitting 31, etc., may be made sufficiently tight so that, even though a true hermetic seal is not obtained, diffusion of air into the probe is very small compared to possible diffusion through aperture 47. The diameter and length of aperture 47 may readily be made such that diffusion of external air into the interior of the probe is very slow.

In practice, it is found that the low concentration of oxygen within the probe may persist for periods of days. Consequently, once the low concentration of oxygen within the probe is obtained, the apparatus may be used from day to day without repeated recyclings to reobtain the low concentration. If, however, at any time the VSWR is observed to be too high, one or more cycles of operation as above described will serve to lower the oxygen concentration.

In lieu of hole 48 opening into the surrounding air, an aperture could be placed in the bottom of the coaxial probe so that, during the initial cooling operation, nitrogen gas flows through the probe. However, it has been found that such an additional aperture must be made quite small in order to avoid too serious a discontinuity in the transmission line which would itself increase the VSWR. With such a small aperture, it is found difficult to obtain adequate flushing of air from the tube. Thus, as the probe cools, a substantial amount of air will enter rather than substantially pure nitrogen. Accordingly, a single aperture in the probe as shown in the specific embodiment is preferred. Hole 48 may readily be made sufficiently large to allow rapid flushing of the tube during the initial portion of the cycle, and does not affect the RF performance of the transmission line.

The invention has been described in connection with a specific embodiment thereof. It will be understood that modifications may be made by those skilled in the art within the spirit and scope of the invention.

We claim:

1. A cold transmission line termination which comprises a refrigerating chamber for a liquefied gas having a boiling point lower than that of liquid oxygen, a hollow transmission line probe having a termination therein, said probe extending into the chamber, an aperture in the probe, and means for providing an atmosphere of said gas at the aperture.

2. A cold transmission line termination which comprises a refrigerating chamber for a liquefied gas having a boiling point lower than that of liquid oxygen, a hollow transmission line probe having a termination at an end thereof, means for mounting the probe in a wall of the chamber for cooling the termination end thereof, an aperture in the wall of the probe, and a tube connecting the chamber and aperture for providing an atmosphere of said gas at the aperture.

3. Apparatus in accordance with claim 2 including a hole in said tube near said aperture and opening into the air.

4. A cold transmission line termination which comprises a refrigerating chamber for a liquefied gas having a boiling point lower than that of liquid oxygen, a hollow coaxial transmission line probe having a resistance termination at an end thereof, means for mounting the probe in a wall of the chamber for cooling the termination end thereof, an aperture in the outer wall of the coaxial transmission line leading to the hollow interior thereof, and means for providing an atmosphere of said gas at the aperture.

5. A cold transmission line termination which comprises a closed refrigerating chamber for a liquefied gas having a boiling point lower than that of liquid oxygen, a closed hollow coaxial transmission line probe having a resistance termination at an end thereof, means for mounting the probe in a wall of the chamber with the termination end thereof extending into the chamber for cooling thereof, an aperture in the outer wall of the coaxial transmission line leading to the hollow interior thereof, said aperture being outside said chamber, a tube connecting the upper region of the closed chamber with said aperture for providing an atmosphere of said gas at the aperture, and a hole in the tube near said aperture and opening into the air, said hole being substantially larger than said aperture.

No references cited.